(12) United States Patent
Peng

(10) Patent No.: US 11,751,703 B2
(45) Date of Patent: Sep. 12, 2023

(54) MODULAR FLOWER BED SYSTEMS

(71) Applicant: Christopher B. Peng, Medina, WA (US)

(72) Inventor: Christopher B. Peng, Medina, WA (US)

( * ) Notice: Subject to any disclaimer, the term of this patent is extended or adjusted under 35 U.S.C. 154(b) by 373 days.

(21) Appl. No.: 17/065,198

(22) Filed: Oct. 7, 2020

(65) Prior Publication Data

US 2022/0104638 A1    Apr. 7, 2022

(51) Int. Cl.
*A47G 7/04* (2006.01)
*E04D 13/00* (2006.01)

(52) U.S. Cl.
CPC .............. *A47G 7/041* (2013.01); *E04D 13/00* (2013.01)

(58) Field of Classification Search
CPC ...... A01G 9/024; A01G 31/02; A01G 31/045; A01G 31/06; A47G 7/02; A47G 7/04; A47G 7/041–047; A47G 2007/048; F16M 11/20; F16M 2200/08; F16M 13/00; F16M 13/02
See application file for complete search history.

(56) References Cited

U.S. PATENT DOCUMENTS

| | | | | |
|---|---|---|---|---|
| 328,926 A | * | 10/1885 | Elliott | A47G 7/044 211/104 |
| 540,681 A | * | 6/1895 | Myers | A47G 7/047 47/41.01 |
| 887,329 A | * | 5/1908 | Igelmann | A01G 9/088 211/80 |
| 1,185,525 A | * | 5/1916 | Morris | A47G 7/044 211/104 |
| 1,251,826 A | * | 1/1918 | Schroeder | A01G 31/02 47/14 |
| 1,392,021 A | * | 9/1921 | Oakes | A01G 31/06 47/14 |
| 1,557,251 A | * | 10/1925 | Hamlin | A47G 25/0685 211/180 |
| 1,637,250 A | * | 7/1927 | Ashing | A01G 31/06 211/74 |

(Continued)

FOREIGN PATENT DOCUMENTS

| | | | | |
|---|---|---|---|---|
| CN | 108916560 A | * | 11/2018 | ............. A01G 9/023 |
| CN | 108978588 A | * | 12/2018 | ............... A01G 9/02 |

(Continued)

*Primary Examiner* — Magdalena Topolski
*Assistant Examiner* — Morgan T Jordan
(74) *Attorney, Agent, or Firm* — Greenberg Traurig, LLP

(57) ABSTRACT

A flower bed system includes an elongated frame having a first side bar and second side bar in a longitudinal direction thereof, a first and a second riser removably attached to the first and second side bar, respectively, the first riser having a first notch away from the first side bar by a predetermined distance and the second riser having a second notch away from the second side bar by approximately the same predetermined distance, and a flowerpot holder having a first and second pin rigidly protruding from opposite sides thereof, respectively, the first and the second pin being substantially aligned in an axial line transverse a center of the flowerpot holder, wherein the first and second pin removably rest in the first and second notch, respectively, so that the flowerpot holder can rotate freely around the axial line.

22 Claims, 4 Drawing Sheets

(56) References Cited

U.S. PATENT DOCUMENTS

| | | | | |
|---|---|---|---|---|
| 1,652,079 A * | 12/1927 | Westerman | A47G 7/041 | 248/171 |
| 1,731,139 A * | 10/1929 | Kift | A47G 7/041 | 248/167 |
| RE17,487 E * | 11/1929 | Heinz | A47G 7/041 | 47/41.01 |
| 1,786,995 A * | 12/1930 | Halberstadter | A47G 7/044 | 248/221.11 |
| 1,828,249 A * | 10/1931 | Hammond | A47G 7/025 | 81/3.39 |
| 1,942,950 A * | 1/1934 | Brown | A47G 7/041 | 248/27.8 |
| 2,028,098 A * | 1/1936 | Zafuta | B67D 1/0425 | 62/297 |
| 2,048,608 A * | 7/1936 | Holland | D06F 39/125 | 248/167 |
| 2,250,361 A * | 7/1941 | Cullinan | A47G 7/025 | 248/346.07 |
| 2,846,107 A * | 8/1958 | Orter | F16B 5/0614 | 217/65 |
| 3,331,524 A * | 7/1967 | Wiley, Jr. | A47G 7/044 | 47/68 |
| 3,717,953 A * | 2/1973 | Kuhn | A01G 18/69 | 47/17 |
| 3,899,844 A * | 8/1975 | Munn | A47G 1/0605 | 40/782 |
| 4,118,002 A * | 10/1978 | Bartlett | F16M 11/42 | 248/311.2 |
| 4,120,119 A * | 10/1978 | Engel | A01G 9/027 | 47/68 |
| 4,122,781 A * | 10/1978 | Potter | A47G 7/041 | 108/189 |
| 4,188,891 A * | 2/1980 | Boyajian | A47G 7/044 | 108/92 |
| 4,255,896 A * | 3/1981 | Carl | A01G 31/06 | 47/79 |
| 4,319,727 A * | 3/1982 | Rattay | A47G 7/041 | 248/172 |
| 4,368,584 A * | 1/1983 | Logan | A47G 1/1666 | 40/792 |
| 4,612,726 A * | 9/1986 | Mori | A01G 9/249 | 47/17 |
| 4,667,438 A * | 5/1987 | Corell | A01G 9/12 | 52/646 |
| 4,896,456 A * | 1/1990 | Grant | A01G 9/024 | 47/67 |
| 4,901,473 A * | 2/1990 | Taule | A01G 9/02 | 248/150 |
| 4,958,671 A * | 9/1990 | Bove | E04B 2/7429 | 160/351 |
| 4,962,614 A * | 10/1990 | Koerper | A01G 9/02 | 47/66.1 |
| 5,040,328 A * | 8/1991 | Coon | A01G 18/62 | 206/505 |
| 5,048,698 A * | 9/1991 | Konrad | A47G 1/1686 | 211/94.01 |
| 5,127,188 A * | 7/1992 | Shaw | A47G 7/044 | 47/68 |
| 5,292,014 A * | 3/1994 | Lelong | A47H 27/00 | 248/218.4 |
| 5,367,823 A * | 11/1994 | Ferris | A47F 7/0078 | 47/41.01 |
| 5,492,301 A * | 2/1996 | Hauser | F16M 11/20 | 248/188.7 |
| 5,647,166 A * | 7/1997 | Neff | A01G 9/12 | 47/45 |
| 6,018,910 A * | 2/2000 | Marks | A01G 9/00 | 47/66.1 |
| 6,209,260 B1 * | 4/2001 | Surette | A01G 9/02 | 52/12 |
| 6,393,764 B1 * | 5/2002 | Smith | A01G 9/02 | 47/65.5 |
| 7,140,149 B2 * | 11/2006 | Searle | A01G 9/02 | 47/65.5 |
| 7,490,847 B2 * | 2/2009 | Dahl | B62B 3/02 | 280/654 |
| 7,735,800 B2 * | 6/2010 | Lunato | A47G 7/044 | 47/68 |
| 7,810,770 B2 * | 10/2010 | Treadwell | A47B 47/027 | 248/300 |
| 7,832,147 B2 * | 11/2010 | Weast | A01G 9/023 | 47/86 |
| 8,418,709 B2 * | 4/2013 | Lindeman | E04H 15/30 | 135/95 |
| 8,635,808 B1 * | 1/2014 | Anderson | A01G 9/028 | 47/85 |
| 8,683,744 B2 * | 4/2014 | Chang | A01G 9/027 | 47/41.01 |
| 9,131,646 B2 * | 9/2015 | Sung | A01G 9/022 | |
| 10,383,287 B2 * | 8/2019 | Kingelin | A01G 9/022 | |
| 10,470,384 B1 * | 11/2019 | Avery | A01G 9/14 | |
| 2002/0088171 A1 | 7/2002 | Shepherd | A01G 9/16 | 47/17 |
| 2006/0032131 A1 * | 2/2006 | Marchioro | A47G 7/044 | 47/68 |
| 2006/0230675 A1 * | 10/2006 | Klohr | A01G 9/026 | 47/66.1 |
| 2006/0290087 A1 * | 12/2006 | Visser | A01G 9/028 | 280/33.998 |
| 2007/0012855 A1 * | 1/2007 | Rocavert | A47H 27/00 | 248/674 |
| 2007/0199241 A1 * | 8/2007 | Peleszezak | E01F 8/027 | 47/65.9 |
| 2008/0099649 A1 * | 5/2008 | Cavasos | A47G 7/044 | 248/316.1 |
| 2009/0090051 A1 * | 4/2009 | Hogan | A01G 9/023 | 47/82 |
| 2009/0183429 A1 * | 7/2009 | Kim | A01G 9/022 | 47/79 |
| 2010/0083573 A1 * | 4/2010 | Gallo | A01G 31/02 | 47/59 R |
| 2010/0187391 A1 * | 7/2010 | Nehls | F24S 25/33 | 52/173.3 |
| 2011/0113685 A1 * | 5/2011 | Chang | A01G 9/025 | 47/39 |
| 2011/0146150 A1 * | 6/2011 | Lyon | A01G 9/025 | 47/70 |
| 2011/0247267 A1 * | 10/2011 | Lutzke | A01G 9/02 | 47/65.7 |
| 2011/0283614 A1 * | 11/2011 | Jaensch | A01G 5/04 | 47/66.1 |
| 2012/0124907 A1 * | 5/2012 | Daas | A01G 9/088 | 47/86 |
| 2012/0247012 A1 * | 10/2012 | Johnson | A01G 13/0225 | 47/32.4 |
| 2014/0013663 A1 * | 1/2014 | Shein | E04B 1/54 | 47/66.1 |
| 2014/0115963 A1 * | 5/2014 | Sung | A01G 9/025 | 248/312.1 |
| 2014/0130411 A1 * | 5/2014 | Topping | A01G 9/28 | 47/66.1 |
| 2014/0190077 A1 * | 7/2014 | Burmann | B65D 19/06 | 220/4.01 |
| 2017/0208760 A1 * | 7/2017 | Lodge | A01G 31/045 | |
| 2017/0231173 A1 * | 8/2017 | Bryant | A01G 27/008 | 47/66.7 |
| 2018/0110188 A1 * | 4/2018 | Zhou | A01G 9/023 | |
| 2019/0208932 A1 * | 7/2019 | Maddocks | A01G 9/028 | |
| 2019/0246582 A1 * | 8/2019 | Tong | A01G 29/00 | |
| 2019/0368520 A1 * | 12/2019 | Maxis | F21V 21/088 | |
| 2020/0214226 A1 * | 7/2020 | Yukawa | A01G 9/023 | |

FOREIGN PATENT DOCUMENTS

| | | | |
|---|---|---|---|
| DE | 3742558 A1 * | 6/1989 | |
| EP | 0285733 A1 * | 10/1988 | A01G 17/005 |
| GB | 2029197 A * | 3/1980 | A47B 57/56 |
| GB | 2077082 A * | 12/1981 | A01G 31/045 |

(56) References Cited

FOREIGN PATENT DOCUMENTS

| | | | | | |
|---|---|---|---|---|---|
| KR | 200170427 | Y1 | * | 2/2000 | ............... A01G 9/12 |
| KR | 20160109741 | A | * | 9/2016 | ............ A01G 7/045 |
| KR | 20190084374 | A | * | 7/2019 | ........... A01G 17/005 |
| WO | WO-2011047641 | A1 | * | 4/2011 | ............. A01G 9/023 |

* cited by examiner

MODULAR FLOWER BED SYSTEMS

BACKGROUND

The present disclosure relates generally to the field of garden systems, and, more particularly, to modular flower bed systems.

$CO_2$ levels have been exponentially increasing for the past hundred years, worsening the air condition. One of ways to combat the rise of $CO_2$ levels is to have more plants as they absorb $CO_2$ and generate oxygen. However, in cities that are packed with buildings, there is often not enough space for greenery. In such cities, people raise plants in rooftop gardens.

Traditional rooftop gardens are often designed and constructed for specific roofs which may have different slope angles and different sizes. Traditional rooftop gardens are often not removable, and may interfere with roof maintenance, etc. As such, what is desired is a modular flower bed system that is easily removable and can be placed on many kinds of rooftops or other surfaces.

SUMMARY

A flower bed system is disclosed which includes an elongated frame having a first side bar and second side bar in a longitudinal direction thereof, a first and a second riser removably attached to the first side bar and the second side bar, respectively, the first riser having a first notch away from the first side bar by a predetermined distance and the second riser having a second notch away from the second side bar by approximately the same predetermined distance, and a flowerpot holder having a first pin rigidly protruding from a first side of the flowerpot holder and a second pin rigidly protruding from a second side of the flowerpot holder, the first and second side being opposite to each other, the first and the second pin being approximately aligned in an axial line transverse a center of the flowerpot holder, wherein the first pin removably rests in the first notch and the second pin removably rests in the second notch so that the flowerpot holder can rotate freely around the axial line.

Figure 1:
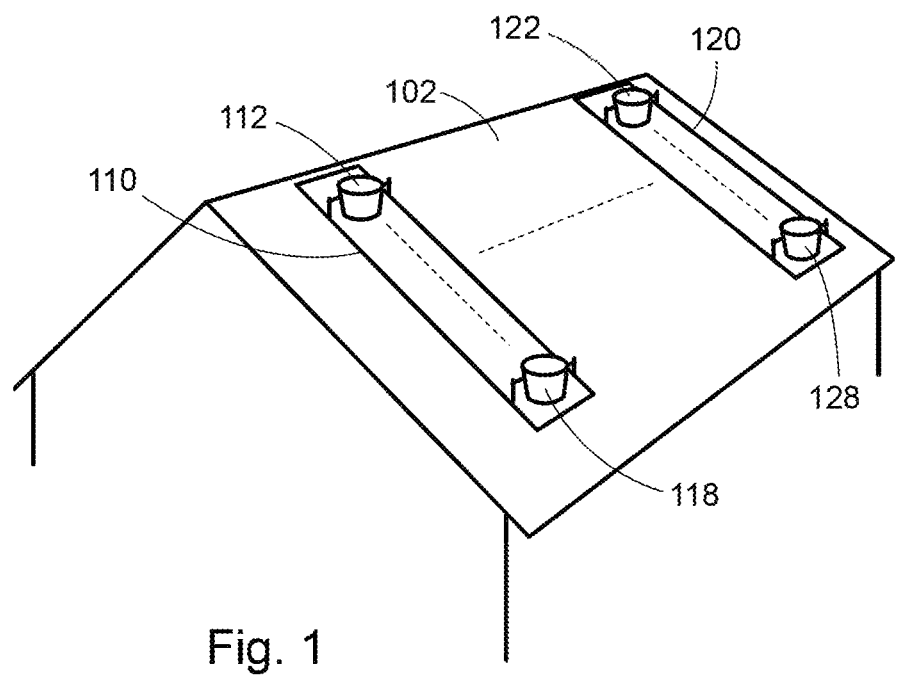
FIG. 1 is a perspective view of a rooftop flower bed system in accordance with an embodiment of the present disclosure.

The drawings accompanying and forming part of this specification are included to depict certain aspects of the disclosure. A clearer conception of the disclosure, and of the components and operation of systems provided with the disclosure, will become more readily apparent by referring to the exemplary, and therefore non-limiting, embodiments illustrated in the drawings, wherein like reference numbers (if they occur in more than one view) designate the same elements. The disclosure may be better understood by reference to one or more of these drawings in combination with the description presented herein.

DESCRIPTION

The present disclosure relates to a modular flower bed system. Preferred embodiments of the present disclosure will be described hereinafter with reference to the attached drawings.

FIG. 1 is a perspective view of a rooftop flower bed system in accordance with an embodiment of the present disclosure. The flower bed system has a plurality of columns of flowerpots represented by flowerpots 112-118 and 122-128 mounted to elongated rectangular frames 110 and 120, respectively. The plurality of frames 110-120 are placed juxtaposing one after another on a sloped surface 102 of a rooftop. In an embodiment, a number of flowerpots in each of the plurality of frames 110-120 is identical, and the corresponding flowerpots are aligned, e.g., the flowerpots 112-122 are in the same horizontal line, so that flowers of different colors may be planted in the flowerpots 112-118 and 122-128 to form a desired pattern. In an embodiment, a length of the frames 110-120 is predetermined and set as a standard, so that a user can base his or her design on the length.

Figure 2:
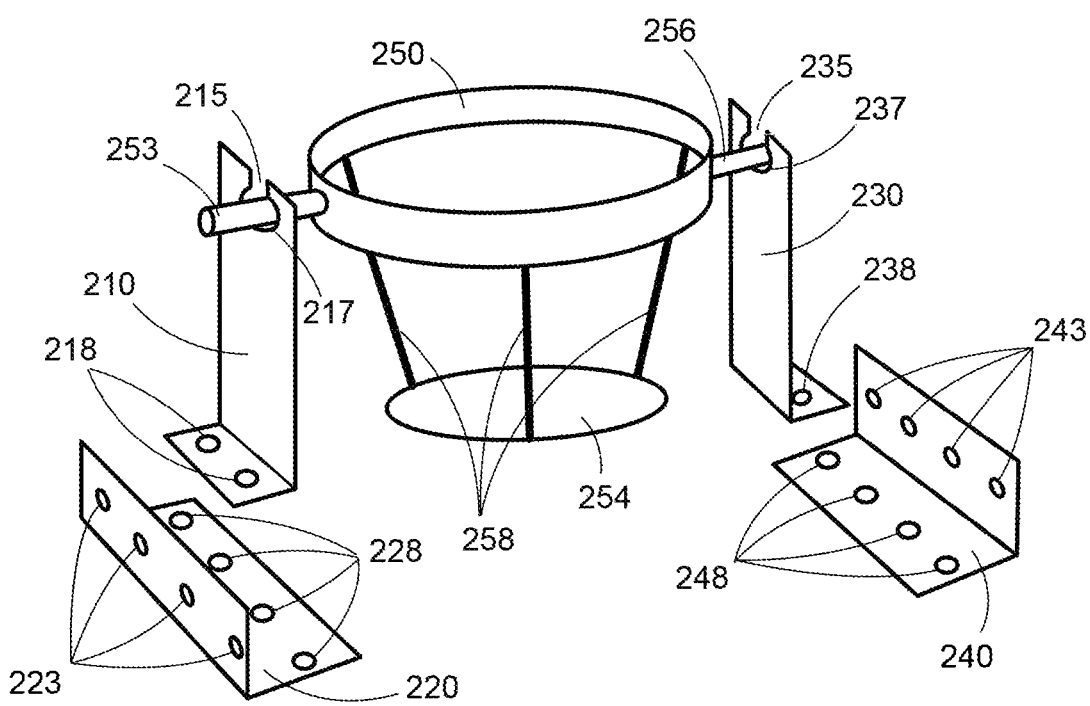
FIG. 2 is a perspective view of an exemplary flowerpot holder assembly used in the flower bed system shown in FIG. 1.

FIG. 2 is a perspective view an exemplary flowerpot holder assembly used in the flower bed system shown in FIG. 1. The flowerpot holder assembly includes a pair of symmetrical risers 210 and 230 that can be mounted to a pair of perforated steel angles 220 and 240, respectively. The perforated steel angles 220 and 240 forms elongated side bars of the frame 110 shown in FIG. 1. In an embodiment, the riser 210 is formed by a "L" shaped metal plate having holes 218 at a horizontal section thereof and a notch 215 at a top end of a vertical section thereof. The holes 218 has approximately the same pitch and diameter as holes 228 on the perforated steel angle 220, so that the holes 218 and the holes 228 can be aligned for screw-mounting the riser 210 to the perforated steel angle 220. As shown in FIG. 2, there are two holes 218 in the riser 210, so that the mounted riser 210 is rigidly mounted to the perforated steel angle 220.

Symmetrical to the riser 210, the riser 230 is also formed by a "L" shaped metal plate having holes 238 at a horizontal section thereof and a notch 235 at a top end of a vertical section thereof. The perforated steel angle 240 is symmetrical to the perforated steel angle 220. There are two hole 238 (although only one is visible in FIG. 2) with the same pitch and diameter as the holes 248 on the perforated steel angle 240 for securing the riser 230 to the perforated steel angle 240 by screws. The perforated steel angles 220 and 240 with numerous holes along their lengths allow the risers 210 and 230 to be mounted at different locations of the frame 110, so that a number and positions of the flowerpots 112-118 mounted to the frame 110 can be adjusted according to a specific design.

Although metal materials are used for constructing the frame 110 and the risers 210 and 230 in the above embodiment, in other embodiments, other materials such as plastic and wood may also be used in place of the metal materials.

Referring to FIG. 2 again, the flowerpot holder further includes a rigid ring 250 and a bottom plate 254 attached to the ring 250 by a plurality of rigid rods 258—although in another embodiment, the rigid rods 258 can be replaced by strings. A diameter of the ring 250 is slightly smaller than an upper diameter of a desired flowerpot (not shown) which has a tapered shape (larger at the top and smaller at the bottom), so that the upper portion of the flowerpot can be clamped by the ring 250. The bottom plate 254 serves to hold up a flowerpot that falls through the ring 250.

Referring to FIG. 2 again, there is a pair of pins 253 and 256 rigidly protruding from opposite sides of the ring 250, respectively. The pins 253 and 256 are substantially aligned in an axial line transverse a center of the ring 250. The pins 253 and 256 removably rest in the notches 215 and 235, respectively, so that the ring 250 along with a flowerpot (not shown) can swing freely around the axial line of the pins 253 and 256. When the perforated steel angles 220 and 240 of the frame 110 are placed on a sloped surface 102 shown in FIG. 1, the gravity will always keep the flowerpot in an upright position regardless the angle of the sloped surface 102. The symmetrical risers 210 and 230 have a predetermined height to keep the desired flowerpot from touching the sloped surface 102. In an embodiment, the notch 215 has a smaller entry than its curved bottom 217. The notch 235 also has a smaller entry than its curved bottom 237.

Figure 3A:
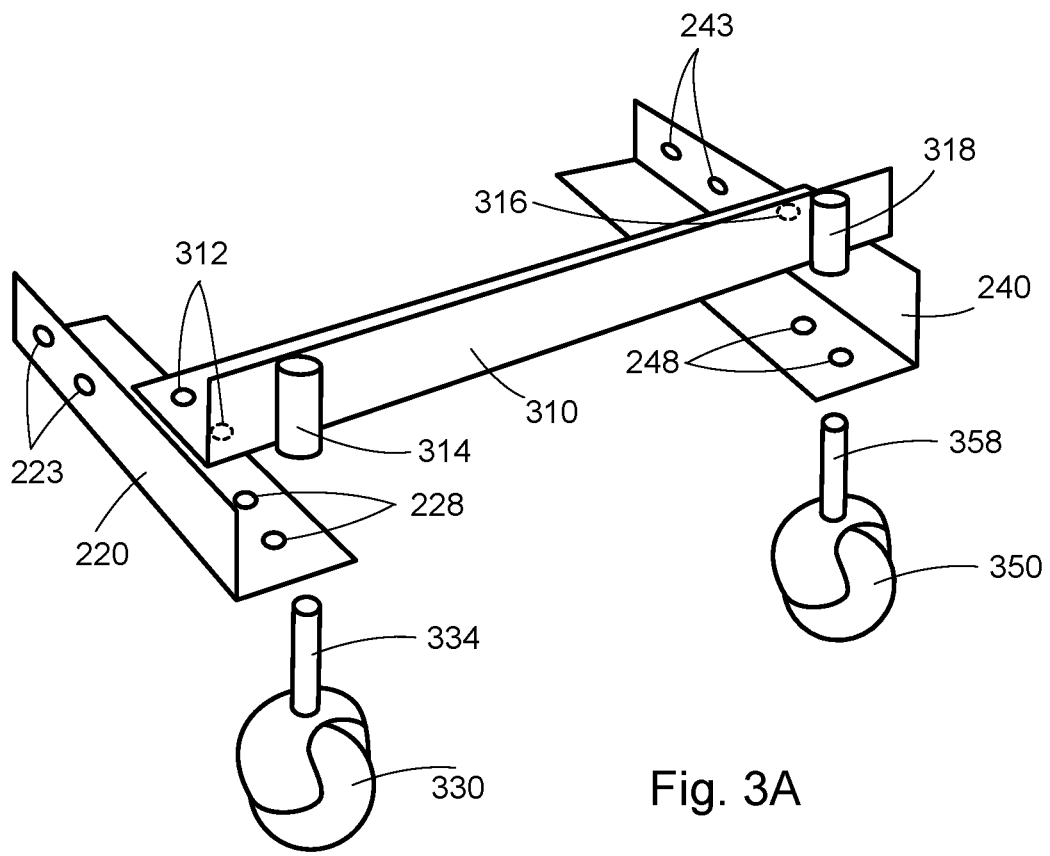
FIG. 3 is a perspective view of an exemplary structure of the frame for the flower bed system shown in FIG. 1.
Figure 3B:
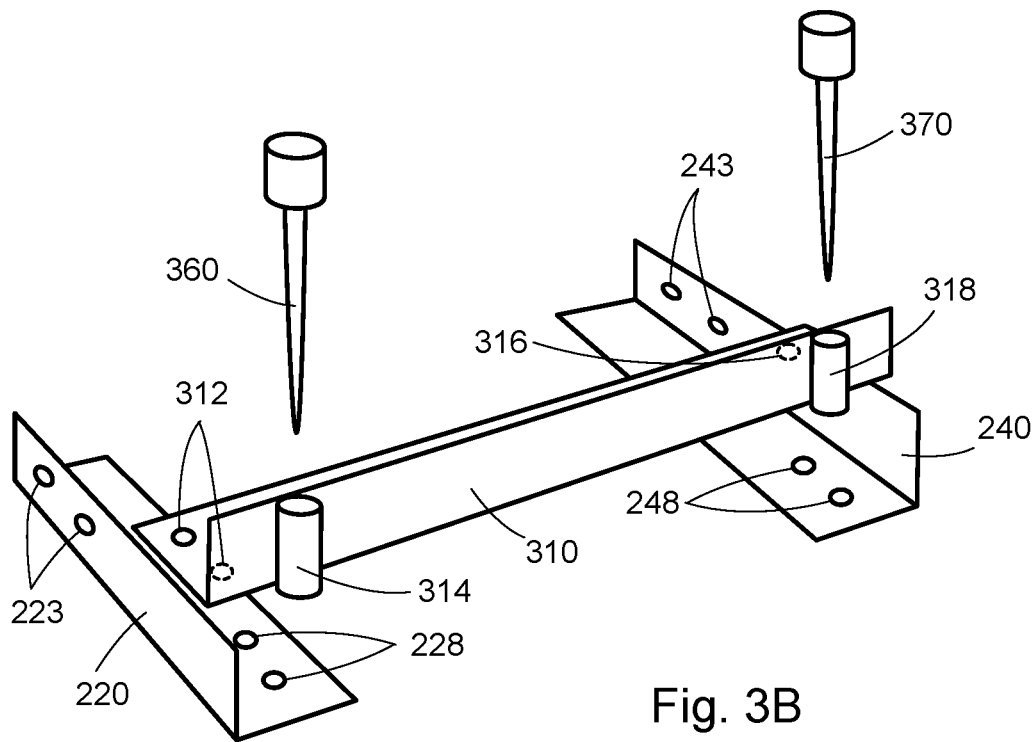

FIG. 3 is a perspective view of an exemplary structure of the frame 110 for the flower bed system shown in FIG. 1. At one end of the frame 110, the perforated steel angles 220 and 240 are joined by a short steel angle 310 to form a cross bar of the frame 110. Symmetrically, another short steel angle (not shown) joins the perforated steel angles 220 and 240 at the other end of the frame 110. In an embodiment, the short steel angle 310 has holes 312 at a first end and holes 316 at a second end opposite to the first end. The holes 312 are aligned with the holes 228, so that the first end of the short steel angle 310 and the perforated steel angle 220 can be screwed together. Similarly, the hole 316 is aligned with the holes 248, so that the second end of the short steel angle 310 and the perforated steel angle 240 can be screwed together. Using screws for the joining the parts of the frame 110 is for easy on-site assembly. Alternatively, the parts can be joined by welding. However, the welding will make the frame 110 permanent.

Referring to FIG. 3 again, a first tube 314 is exemplarily welded to a location near the first end of the short steel angle 310, and a second tube 318 is exemplarily welded to a location near the second end of the short steel angle 310. In an embodiment, swivel casters 330 and 350 can be attached to the frame 110 by inserting pin 334 of the caster 330 and pin 358 of the caster 350 into the first tube 314 and the second tube 318, respectively, so that the frame 110 can be move around easily. In another embodiment, when the frame 110 is placed on a sloped soil or sandy surface, nails 360 and 370 can be driven through the first and second tubes 314 and 318, respectively, into the soil to prevent the frame 110 from sliding.

As shown in FIG. 3, the perforated steel angles 220 and 240 have their vertical side facing outside of the frame 110, so that neighboring frames can be connected by screws through the holes 223 or 243 to expand a width of the flower bed system shown in FIG. 1.

Figure 4A:
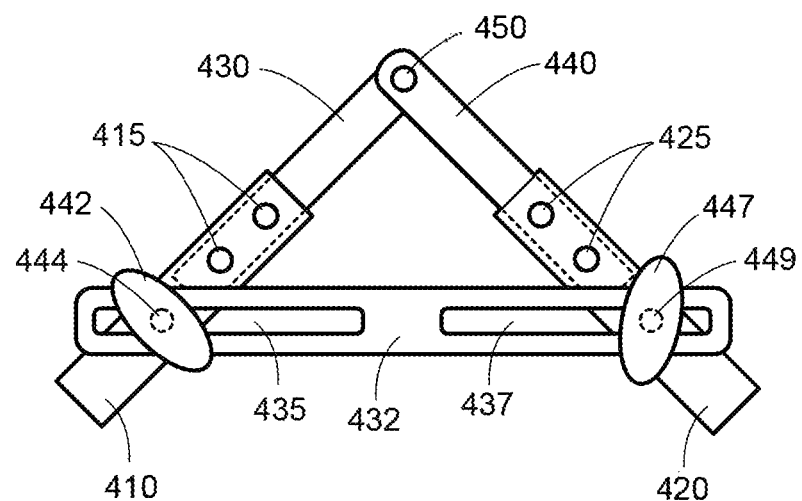
FIGS. 4A and 4B illustrates exemplary frame joining fixtures for the flower bed system shown in FIG. 1.
Figure 4B:
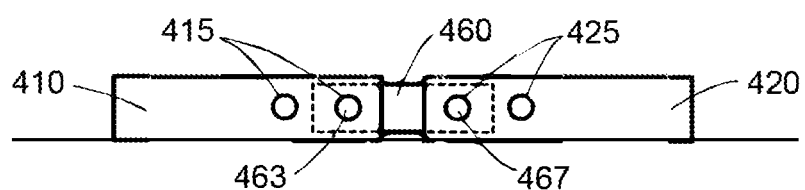

FIGS. 4A and 4B illustrates exemplary frame joining fixtures for expanding the flower bed system shown in FIG. 1 lengthwise. The fixture in FIG. 4A includes a first plate 430 and a second plate 440 joined by an exemplary rivet 450 which allows the first plate 430 and the second plate 440 to rotate relative to each other around the rivet 450. On another end of the plate 430, there are two holes 415 coinciding with the holes on a first frame 410, so that two screws can be used to rigidly attach the plate 430 to the frame 410. On another end of the plate 440, there are also two holes 425 coinciding with the holes on a second frame 420, so that two screws can be used to rigidly attach the plate 440 to the frame 420. In an embodiment, two of such fixtures may be used for joining one pair of frames. The rotation around the rivet 450 allows the two frames 410 and 420 to be placed either on a flat surface or on two sloped surfaces such as a rooftop.

Referring again to FIG. 4A, the frame joining fixture also include a horizontal plate 432 with elongated openings 435 and 437 thereon. A hand knob 442 with a screw head 444 tightens an end of the horizontal plate 432 to the first frame 410 through the elongated opening 435. Similarly, another hand knob 447 with a screw head 449 tightens another end of the horizontal plate 432 to the second frame 420 through the elongated opening 437. As a result, the horizontal plate 432, the first and the second frame forms a stable triangle for strengthening the structure of the flower bed system. The elongated opening 435 and 437 allows the horizontal plate 432 to be mounted to the first frame 410 and the second frame 420 at different locations, so that an angle formed by the first frame 410 and the second frame 420 is adjustable.

An alternative fixture shown in FIG. 4B includes a plate 460 which has a first hole 463 at a first end and a second hole 467 at a second end. The first hole 463 coincides with one of the holes 415 on the first frame 410 for pivotally attaching the first end of the plate 460 to the first frame 410 by a set of bolt and nut. The second hole 467 coincides with one of the holes 425 on the second frame 420 for pivotally attaching the second end of the plate 460 to the second frame 410 also by a set of bolt and nut. The pivotal attachments allow the two frames 410 and 420 to be placed either on a flat surface or on two sloped surfaces such as a rooftop.

Figure 5A:
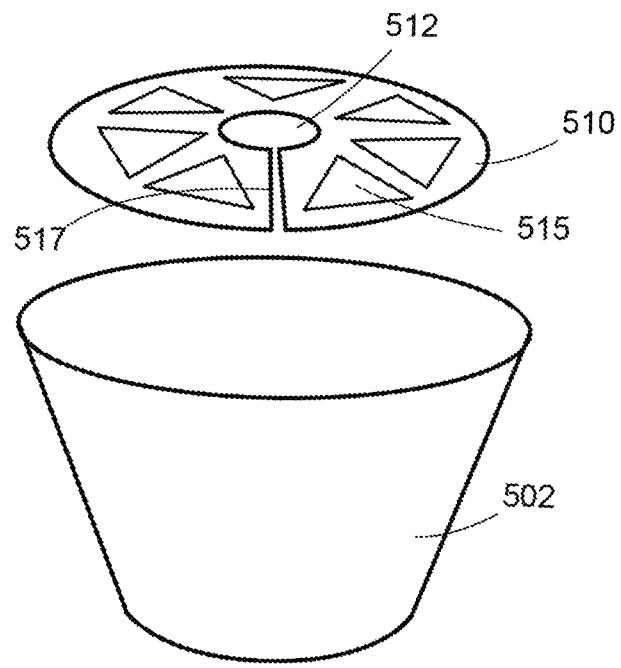
FIGS. 5A and 5B are perspective views of exemplary pot covers in accordance with embodiments of the present disclosure.

FIG. 5A illustrates a pot cover for a flowerpot in accordance with an embodiment of the present disclosure. The pot cover includes a circular plate 510 having a diameter smaller than a top of a flowerpot 502, so that the circular plate 510 can be placed inside the flowerpot 502 on top of the soil (not shown) contained therein. The circular plate 510 has a center opening 512 and a plurality of surround openings represented by a triangular pattern 515. The center opening 512 allows stems of a plant to reach out. The surround openings 515 allow water and other elements to reach the soil. As shown in FIG. 5, the circular plate 510 also has a split 517 extending from the center opening 512 to a perimeter of the circular plate 510 to facilitate the insertion and removal of pot cover when a plant is already in the flowerpot 502. The circular plate 510 may further have spikes (not shown) on a bottom side for anchoring the pot cover to the soil.

Figure 5B:
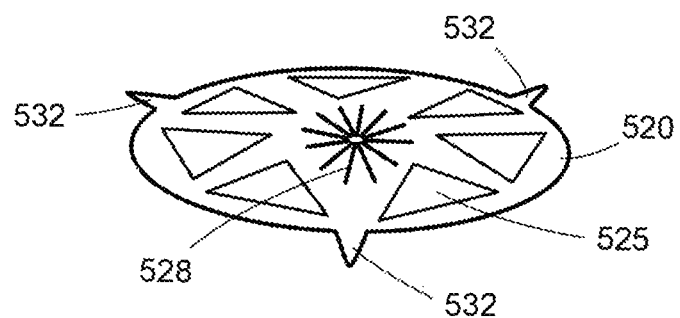

FIG. 5B illustrates an alternative pot cover in accordance with an embodiment of the present disclosure. The alternative pot cover includes a circular plate 520 with numerous openings 525 and numerous slits 528. The slits 528 commonly cross approximately a center of the circular plate 520, so that the circular plate 520 forms numerous triangle pieces separated by the slits 528 with tips thereof disjoined at the center. In an embodiment, the pot cover is made of a thin flexible material, such as plastic or sheet metal, thus tips of the triangle pieces can be bent to form a large opening at the center to allow a stem of a plant to pass through. In addition, the circular plate 520 has a plurality of protruding members 532 evenly scattered around a circumference thereof. The protruding members 532 serve to squeeze on side walls of the flowerpot 502 so that the pot cover 520 can be secured to the flowerpot 502.

Although the disclosure is illustrated and described herein as embodied in one or more specific examples, it is nevertheless not intended to be limited to the details shown, since various modifications and structural changes may be made therein without departing from the spirit of the disclosure and within the scope and range of equivalents of the claims. Accordingly, it is appropriate that the appended claims be construed broadly and, in a manner, consistent with the scope of the disclosure, as set forth in the following claims.

What is claimed is:

1. A flower bed system comprising:
    an elongated frame having a first side bar and second side bar parallel to a longitudinal direction of the elongated frame;
    a first and a second riser removably attached to the first side bar and the second side bar, respectively, the first riser having a first notch away from the first side bar by a predetermined distance and the second riser having a second notch away from the second side bar by the same predetermined distance; and
    a flowerpot holder having a first pin rigidly protruding from a first side of the flowerpot holder and a second pin rigidly protruding from a second side of the flowerpot holder, the first and second side being opposite to each other, the first and the second pin being substantially aligned in an axial line transverse a center of the flowerpot holder;
    wherein the first pin removably rests in the first notch and the second pin removably rests in the second notch so that the flowerpot holder can rotate freely around the axial line.

2. The flower bed system of claim 1, wherein the first and second side bar are removably connected by a first and a second cross bar to form a rectangular frame.

3. The flower bed system of claim 2, wherein the first and the second cross bar are made of steel angles and connected to the first and the second side bar by screws.

4. The flower bed system of claim 2 further comprising a tube rigidly attached to the frame, a shaft of the tube being substantially perpendicular to a plane formed by the elongated frame.

5. The flower bed system of claim 4, wherein the tube is welded to the first cross bar.

6. The flower bed system of claim 4 further comprising a caster having a pin removably inserted in the tube.

7. The flower bed system of claim 4 further comprising a nail inserted through the tube.

8. The flower bed system of claim 1, wherein the first and the second side bar are made of perforated steel angles, each of the perforated steel angles having a vertical section being substantially perpendicular to a plane formed by the elongated frame and a horizontal section being substantially parallel to the plane.

9. The flower bed system of claim 8, wherein the vertical sections of the first and the second side bar face outside of the elongated frame so that two units of the elongated frame can be mounted next to each other by screws through holes on the vertical sections of the perforated steel angles.

10. The flower bed system of claim 8, wherein each of the first and the second riser is a "L" shaped metal plate with a hole at a bottom section thereof for screw-mounting the first and the second riser to the first and the second side bar, respectively.

11. The flower bed system of claim 1, wherein the first notch is at a top end of the first riser and the second notch is at a top end of the second riser.

12. The flower bed system of claim 1, wherein each of the first and the second notch has a narrow entry to a wider bottom with a curved profile.

13. The flower bed system of claim 1, wherein the flowerpot holder has a circular ring for clamping a top part of a flowerpot.

14. The flower bed system of claim 13, wherein the flowerpot holder has a bottom plate coupled to the circular ring by a plurality of rods for holding up a bottom of a flowerpot.

15. The flower bed system of claim 1 further comprising a pot cover removably placed on a flowerpot.

16. The flower bed system of claim 15, wherein the pot cover has a center opening and a plurality of surround openings.

17. The flower bed system of claim 16, wherein the center opening is formed by a plurality of slits crossing at a center of the pot cover.

18. The flower bed system of claim 16, wherein the pot cover has a split extending from the center opening to a perimeter of the pot cover.

19. The flower bed system of claim 15, wherein the pot cover has one or more spikes on a bottom surface thereof for anchoring the pot cover to soils in the flowerpot.

20. The flower bed system of claim 1 further comprising a joining fixture including a first and a second plate pivotally joined by a rivet, the first plate having a hole aligned to a hole at an end of the first side bar for screw-mounting the first plate to the end of the first side bar through the holes.

21. The flower bed system of claim 1 further comprising a joining fixture including a plate having a first end pivotally attached to an end of the first side bar.

22. The flower bed system of claim 21, wherein the plate has an elongated opening for being adjustably attached to the first side bar.

* * * * *